(12) United States Patent
Kobayashi

(10) Patent No.: US 7,847,859 B2
(45) Date of Patent: Dec. 7, 2010

(54) EXPOSURE CONTROL METHOD AND IMAGING APPARATUS

(75) Inventor: Koji Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 789 days.

(21) Appl. No.: 11/715,454

(22) Filed: Mar. 8, 2007

(65) Prior Publication Data
US 2007/0212054 A1 Sep. 13, 2007

(30) Foreign Application Priority Data
Mar. 8, 2006 (JP) .............................. 2006-063218

(51) Int. Cl.
H04N 5/222 (2006.01)
(52) U.S. Cl. .................................... 348/371
(58) Field of Classification Search ................. 348/370, 348/371
See application file for complete search history.

(56) References Cited

U.S. PATENT DOCUMENTS

| | | | | |
|---|---|---|---|---|
| 7,167,203 | B1 * | 1/2007 | Yukawa et al. ............... | 348/357 |
| 7,509,042 | B2 * | 3/2009 | Mori et al. ................... | 396/155 |
| 2005/0024508 | A1 * | 2/2005 | Okisu et al. .................. | 348/254 |
| 2005/0122420 | A1 * | 6/2005 | Matsui ........................ | 348/370 |
| 2005/0219381 | A1 * | 10/2005 | Takeuchi et al. .......... | 348/229.1 |

FOREIGN PATENT DOCUMENTS

| | | | |
|---|---|---|---|
| JP | 6-148725 A | 5/1994 | |
| JP | 07-128703 A | 5/1995 | |
| JP | 08-022044 A | 1/1996 | |
| JP | 2001-339636 A | 12/2001 | |
| JP | 2002-333649 A | 11/2002 | |
| JP | 2005-204120 A | 7/2005 | |

OTHER PUBLICATIONS

JP Notification of Reasons for Refusal, mailed Jul. 28, 2010, issued in corresponding JP Application No. 2006-063218, 4 pages in English and Japanese.

\* cited by examiner

*Primary Examiner*—Lin Ye
*Assistant Examiner*—Amy Hsu
(74) *Attorney, Agent, or Firm*—Sughrue Mion, PLLC (57) ABSTRACT

A digital camera automatically changes its imaging sensitivity based on a proper exposure value that is calculated at a predetermined standard imaging sensitivity based on subject brightness measured from a photometry area of a scene to shoot. When the decided imaging sensitivity is higher than a predetermined sensitivity threshold value, the scene is judged to be a low brightness backlit scene that contains a higher brightness portion around a dark main subject, and a lower brightness portion around the higher brightness portion. A rear light judgment value is calculated as a difference between a central photometric value and a peripheral photometric value of a photometry area, and is compared with a predetermined rear light threshold value, to judge whether the scene is backlit or not. When the scene is judged to be a backlit scene or a low brightness backlit scene, the digital camera emits a flash light synchronously with an exposure.

3 Claims, 13 Drawing Sheets

☐ HIGHER BRIGHTNESS
▒ LOWER BRIGHTNESS

FIG.13B
(PRIOR ART)

☐ HIGHER BRIGHTNESS
▒ LOWER BRIGHTNESS

EXPOSURE CONTROL METHOD AND IMAGING APPARATUS

FIELD OF THE INVENTION

The present invention relates to an exposure control method and an imaging apparatus, and more particularly to an imaging apparatus that has a function to change imaging sensitivity and a function to emit a flash light to a backlit scene.

BACKGROUND OF THE INVENTION

Digital cameras have been widespread, which convert an optical image of a subject into electric image signal through an imaging device, such as a CCD image sensor or a CMOS image sensor. The image signal is converted into digital image data, and is written in a memory or a recording medium. Many of the digital cameras are provided with a flash device for projecting a flash of illumination light to the subject during an exposure, some of which automatically emit the flash light according to the subject brightness in an automatic flash mode.

Figure 11:
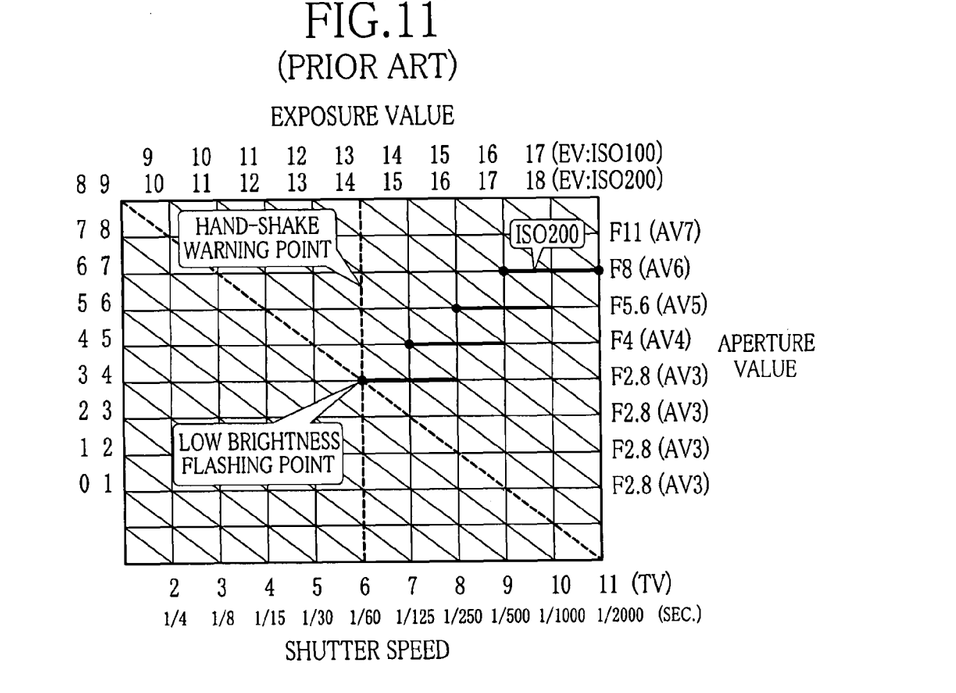
FIG. 11 is a program chart for a conventional automatic exposure control operation.

FIG. 11 shows an example of a program chart used for an automatic exposure control operation in a conventional digital camera, wherein a horizontal axis shows shutter speed (time value TV), a vertical axis shows aperture value (AV) of a stop, and diagonal lines represent exposure values (EV). In this example of conventional digital camera, imaging sensitivity is fixed to be ISO200, and the aperture value and the shutter speed are changed at each shot according to the exposure value calculated based on the subject brightness. Besides, a threshold exposure value below which the digital camera automatically emits a flash light, hereinafter referred to as a low brightness flashing point, is preset at EV8 as converted to ISO100 base. Furthermore, because hand-shake is likely to occur when the shutter speed is slower than 1/60 second (=TV6), a threshold value below which a hand-shake warning is given, hereinafter referred to as a hand-shake warning point, is preset at TV6.

Figure 12A:
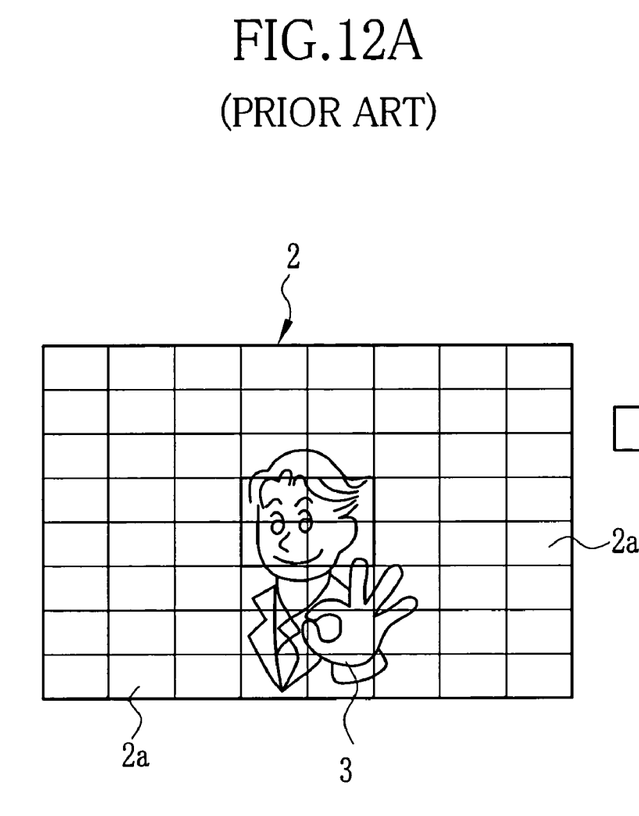
FIGS. 12A and 12B are explanatory diagrams illustrating a photometry area used for a rear light judgment.
Figure 12B:
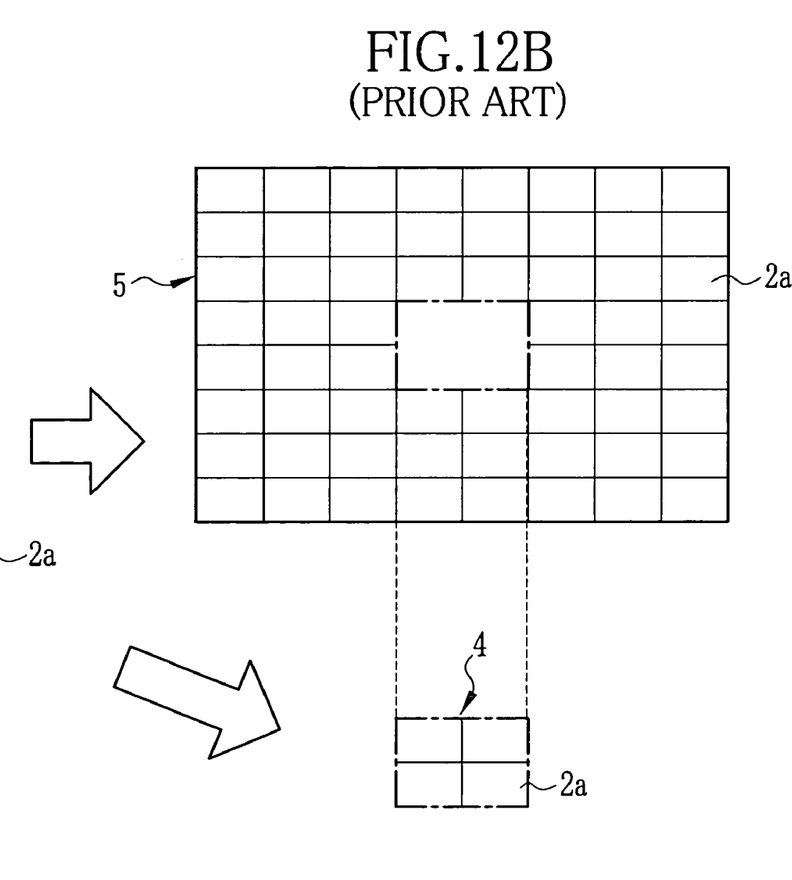

There have been such digital cameras that judge whether a scene to shoot is a backlit scene or not, and flash automatically to the backlit scene, as disclosed for example in Japanese Laid-open Patent Application Nos. Hei 6-148725, 2001-339636 and 2002-333649. As shown in FIGS. 12A and 12B, these cameras have a photometry area 2 that is divided into several segments 2a, and the segments 2a are partitioned into a central zone 4 and a peripheral zone 5. In most cases, a main subject is placed in the central zone 4, and the peripheral zone 5 corresponds to a background. A photometric value is detected from each segment 2a, and mean photometric values of the central zone 4 and the peripheral zone 5 are calculated respectively. The mean photometric value of the central zone 4 is subtracted from that of the peripheral zone 5 to obtain a photometric value difference, and the photometric value difference is used as a rear light judgment value to be compared with a threshold value for rear light judgment.

Figure 13A:
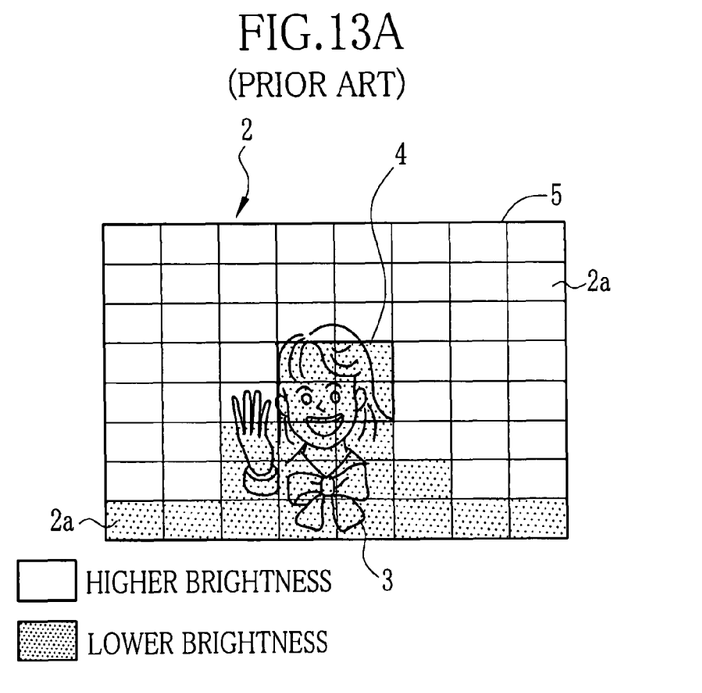
FIGS. 13A and 13B are explanatory diagrams illustrating an example of a backlit scene and an example of a low brightness backlit scene, respectively.

More specifically, with respect to such a scene as shown in FIG. 13A, the rear light judgment value will be larger than the rear light threshold value, so the scene of FIG. 13A is judged to be a backlit scene, and a flash light is emitted. In order to avoid misjudging a scene having a dark subject in the central zone 4 to be a backlit scene, the rear light threshold value is set at a relatively large value, e.g. Δ2EV.

Such a digital camera has also been brought into the market that has a function to change over its imaging sensitivity according to the subject brightness, so that a dark scene can be shot at a higher shutter speed. In this case, the imaging sensitivity is virtually changed by changing amplification gain of the image signal obtained through the imaging device. This type of digital camera can extend the flash light reaching distance, and shoot a dark scene with a brighter background, so the atmosphere of the dark scene is adequately reproduced. As the scene is shot at a higher shutter speed, hand-shake is reduced. Moreover, such a scene that would conventionally need a flash light can be shot without the flash.

Figure 14:
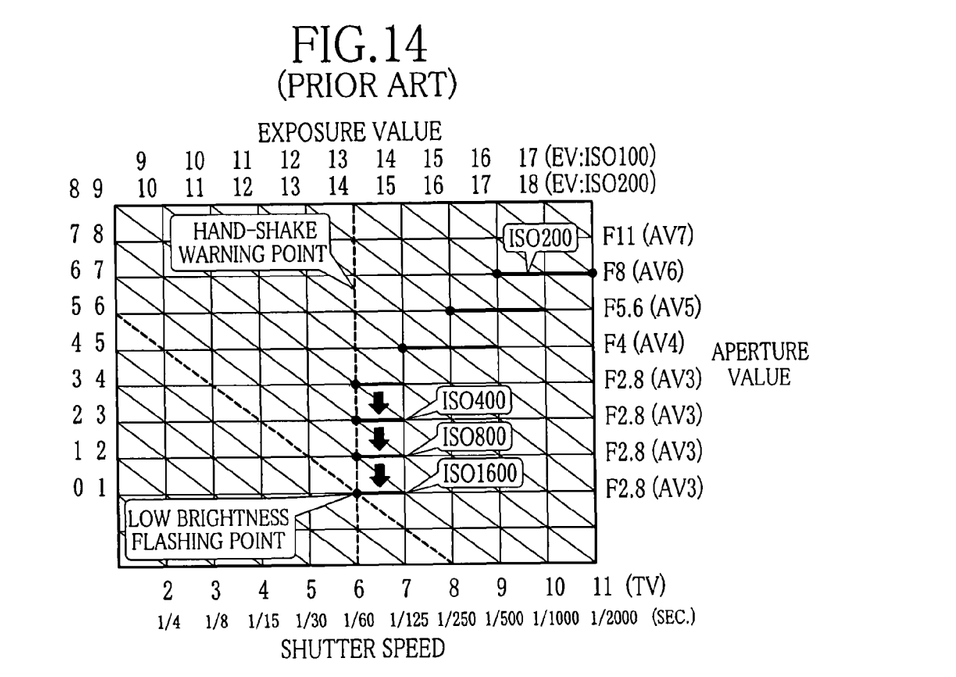
FIG. 14 is a program chart for an automatic exposure control operation in a conventional sensitivity changeable digital camera.

As shown in a program chart of FIG. 14, the digital camera with the sensitivity changing function uses a standard sensitivity, e.g. ISO200, for those scenes where proper exposure values are relatively high, e.g. over EV8 as converted to ISO100 base. For those scenes where proper exposure values are so low that the aperture value should be set at an open aperture and the shutter speed should be slower than the handshake warning point, the imaging sensitivity is automatically changed to ISO400, ISO800 or ISO1600. Since the imaging sensitivity is automatically increased for the dark scene, the low brightness flashing point is preset at a lower value, e.g. EV5 as converted to ISO100 base. This type of digital camera also has the above-described automatic flashing function based on the rear light judgment.

Figure 13B:
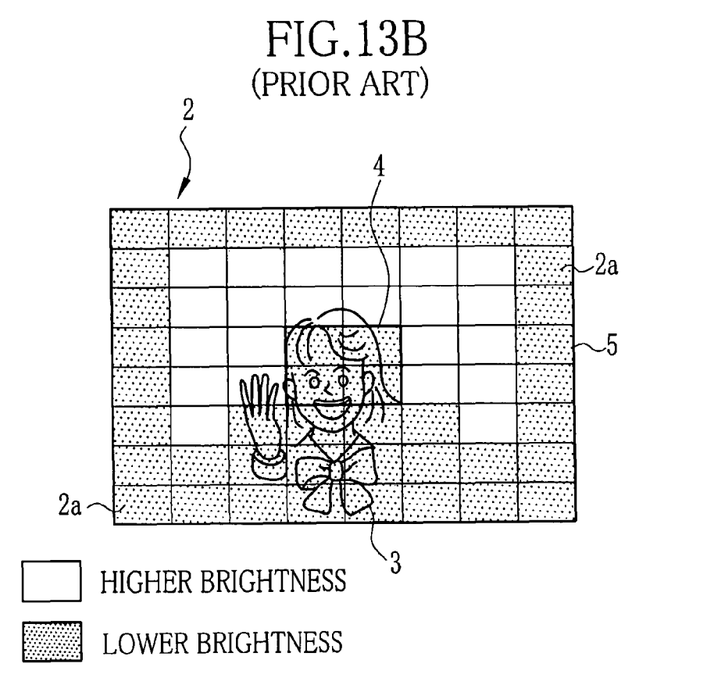

Meanwhile, when a picture is shot under a bright illumination light at night, there may be a higher brightness portion around the main subject 3 in the peripheral zone 5, as shown for example in FIG. 13B. In that case, because a lower brightness portion surrounds the higher brightness portion, the mean photometric value of the peripheral zone 5 will be so low that the rear light judgment value is less than the rear light threshold value, even while the brightness of the main subject 3 is lower than its peripheral higher brightness portion. As a result, the scene is not judged to be a backlit scene even while it is actually a backlit scene. Such a scene as shown in FIG. 13B will be referred to as a low brightness backlit scene. Since the exposure value for the low brightness backlit scene is lower than the low brightness flashing point EV8 of the conventional digital camera with fixed imaging sensitivity, a flash light is automatically emitted in this type of digital camera, so the main subject of the obtained image will be properly exposed.

However, as the low brightness flashing point is set at the lower value, i.e. EV5, in the digital camera with the sensitivity changing function, if the low brightness backlit scene is so dark that its exposure value is EV8 to EV5, the scene is shot without the flash in this type digital camera, so the obtained image is improperly exposed.

To solve this problem, it has been suggested, for example in the above-mentioned Japanese Laid-open Patent Application No. 2001-339636, lowering the rear light threshold value to promote the automatic flashing to the backlit scenes, while lowering the volume of the flash light. Thereafter, the image quality is corrected in the image processing. If, however, the subject distance is so far that the flash light does not reach the subject, the image processing can result in breaching out the background.

SUMMARY OF THE INVENTION

In view of the foregoing, a primary object of the present invention is to provide an exposure control method and an imaging apparatus, which make it possible to emit a flash light properly in the low brightness backlit scene.

According to the present invention, an exposure control method for a sensitivity changeable imaging apparatus with a flash device, comprises steps of measuring subject brightness from a photometry area of a scene to shoot; calculating based on the measured subject brightness a proper exposure value at a predetermined standard imaging sensitivity; deciding based on the calculated proper exposure value at least a shutter speed and an imaging sensitivity; and comparing the decided imaging sensitivity with a predetermined sensitivity threshold value, to decide that the flash device is to emit a flash light when the decided imaging sensitivity is higher than the predetermined sensitivity threshold value.

Instead of comparing the imaging sensitivity with the predetermined threshold value, it is possible to compare the calculated proper exposure value with a predetermined threshold exposure value, in order to judge whether the flash device is to emit a flash light or not. In this case, when the calculated proper exposure value is lower than the predetermined threshold exposure value, the flash device is decided to emit a flash light.

Because the subject brightness measured from the low brightness backlit scene is low, the proper exposure value for the low brightness rear light scene is correspondingly small. As the imaging sensitivity is changed to a higher value when the proper exposure value is less than a predetermined value corresponding to the hand-shake warning point, it is possible to judge that the scene is not a low brightness backlit scene when the decided imaging sensitivity is not higher than the predetermined sensitivity threshold value, or when the decided proper exposure value is not less than the predetermined exposure threshold value.

Preferably, the exposure control method of the present invention further comprises steps of calculating a rear light judgment value from the measured subject brightness; judging whether the scene is a backlit scene or not by comparing the rear light judgment value with a predetermined rear light threshold value; and deciding that the flash device is to emit a flash light when the scene is judged to be the backlit scene. The step of calculating the rear light judgment value comprises steps of calculating a mean photometric value of a central zone of the photometry area and a mean photometric value of a peripheral zone of the photometry area; and subtracting the mean photometric value of the central zone from the mean photometric value of the peripheral zone, to obtain a difference as the rear light judgment value.

The present invention also suggests an exposure control method for a sensitivity changeable imaging apparatus with a flash device, which comprises steps of measuring subject brightness from a photometry area of a scene to shoot; calculating a rear light judgment value from the measured subject brightness; calculating based on the measured subject brightness a proper exposure value at a predetermined standard sensitivity; deciding based on the calculated proper exposure value at least a shutter speed and an imaging sensitivity; comparing the calculated proper exposure value with a predetermined threshold exposure value; comparing the rear light judgment value with a predetermined first rear light threshold value to judge whether the scene is backlit or not, when the calculated proper exposure value is not less than the predetermined threshold exposure value; comparing the rear light judgment value with a predetermined second rear light threshold value to judge whether the scene is backlit or not, when the calculated proper exposure value is less than the predetermined threshold exposure value; and deciding that the flash device is to emit a flash light when the scene is judged to be a backlit scene.

When the calculated proper exposure value is not less than the threshold exposure value, the scene is not judged to be the low brightness backlit scene. Since the different rear light threshold value is applied to the judgment for the low brightness backlit scene from that applied to the ordinary rear light judgment, a risk of flashing to a front-lit scene at a high imaging sensitivity is eliminated, and thus the obtained image is prevented from being over-exposed and bleached out.

An imaging apparatus of the present invention comprises a flash device for emitting a flash light toward a subject; an imaging device for converting an optical image of the subject into electric image signal; a shutter speed changing device; a sensitivity changing device for changing imaging sensitivity of the imaging device by changing gain of amplification of the electric image signal; and an exposure control device, wherein the exposure control device measures brightness of the subject from a photometry area, calculates based on the measured subject brightness a proper exposure value at a predetermined standard imaging sensitivity, decides based on the calculated proper exposure value at least a shutter speed and an imaging sensitivity, compares the decided imaging sensitivity with a predetermined threshold value, and decides that the flash device is to emit a flash light when the decided imaging sensitivity is higher than the predetermined threshold value.

It is alternatively possible to compare the calculated proper exposure value with a predetermined threshold value, and decide that the flash device is to emit a flash light when the calculated proper exposure value is less than the predetermined threshold value.

Preferably, the exposure control device may calculate a rear light judgment value by subtracting a mean photometric value of a central area of the photometry area from a mean photometric value of a peripheral area of the photometry area, and compare the rear light judgment value with a predetermined first rear light threshold value when the calculated proper exposure value is not less than the predetermined threshold exposure value, or with a predetermined second rear light threshold value when the calculated proper exposure value is less than the predetermined threshold exposure value. In that case, the flash device is decided to emit a flash light when the rear light judgment value is not less than the compared rear light threshold value.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1A:
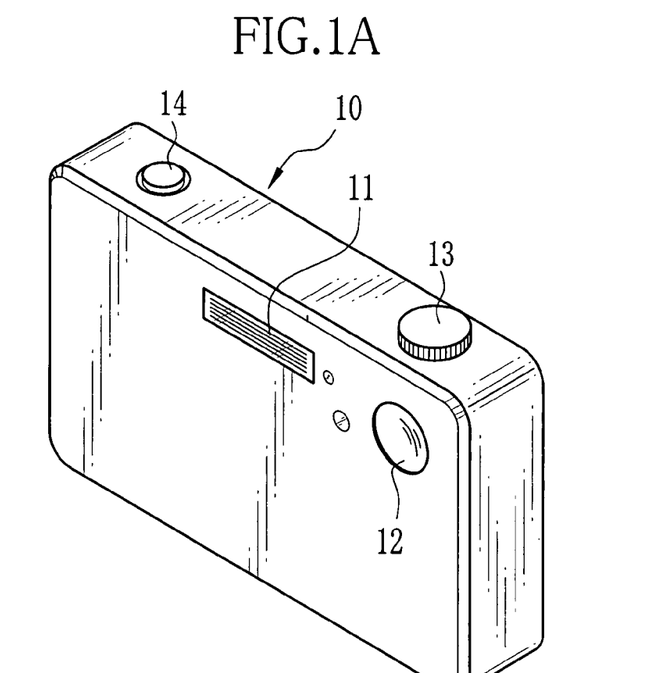
FIGS. 1A and 1B are front and rear perspective views of a digital camera embodying an imaging apparatus of the present invention.
Figure 1B:
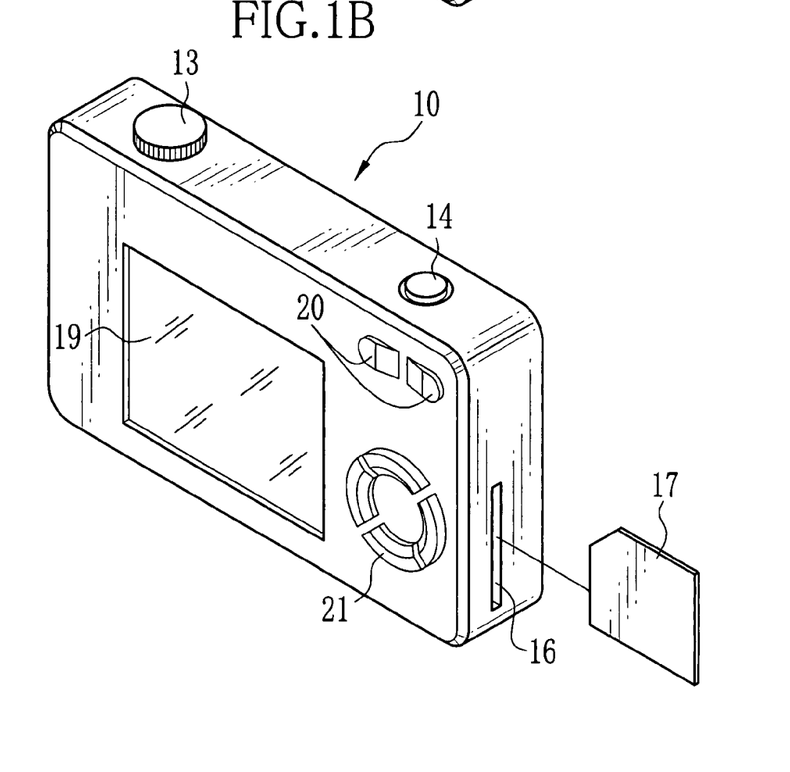

As shown in FIGS. 1A and 1B, a digital camera 10 embodying an imaging apparatus of the present invention has a thin substantially parallelepiped body. A flash projector 11 for projecting a flash light toward a subject, and a taking lens 12 for forming an optical image of the subject are disposed on a front of the digital camera 10. A mode dial 13 and a release button 14 are disposed on a top of the digital camera 10.

The mode dial 13 is turned to switch over between indexed positions. When the mode dial 13 is turned from a power-off position to one of other positions for selecting various modes, including a still image shooting mode, a moving image shooting mode, a reproduction mode and a setup mode, the digital camera 10 is powered on. The release button 14 can be pressed in two steps, that is, to a half-pressed position and a full-pressed position. As will be described in detail later, when the release button 14 is operated into the half-pressed position, a first switch is turned on to output a signal S1 for starting an automatic focusing (AF) operation and an automatic exposure control (AE) operation. When the release button 14 is operated into the full-pressed position, a second switch is turned on to output a signal S2 for starting a preparatory shooting and then a final shooting.

The digital camera 10 is provided with a card slot 18 on one side, for accepting a memory card 17, so image data obtained by the digital camera 10 is written in the memory card 17. An LCD 19 is disposed on a back of the digital camera 10. The LCD 19 functions as an electronic viewfinder in the still image shooting mode and the moving image shooting mode, displaying a camera-through image of a subject existing in a shooting field of the digital camera 10. In the reproduction mode, images are reproduced from the image data written in the memory card 17, to be displayed on the LCD 19. Disposed on the right side of the LCD 19 are a zoom button 20 for changing zoom ratio of the taking lens 12, and a cursor button 21 operated in the setup mode.

Figure 2:
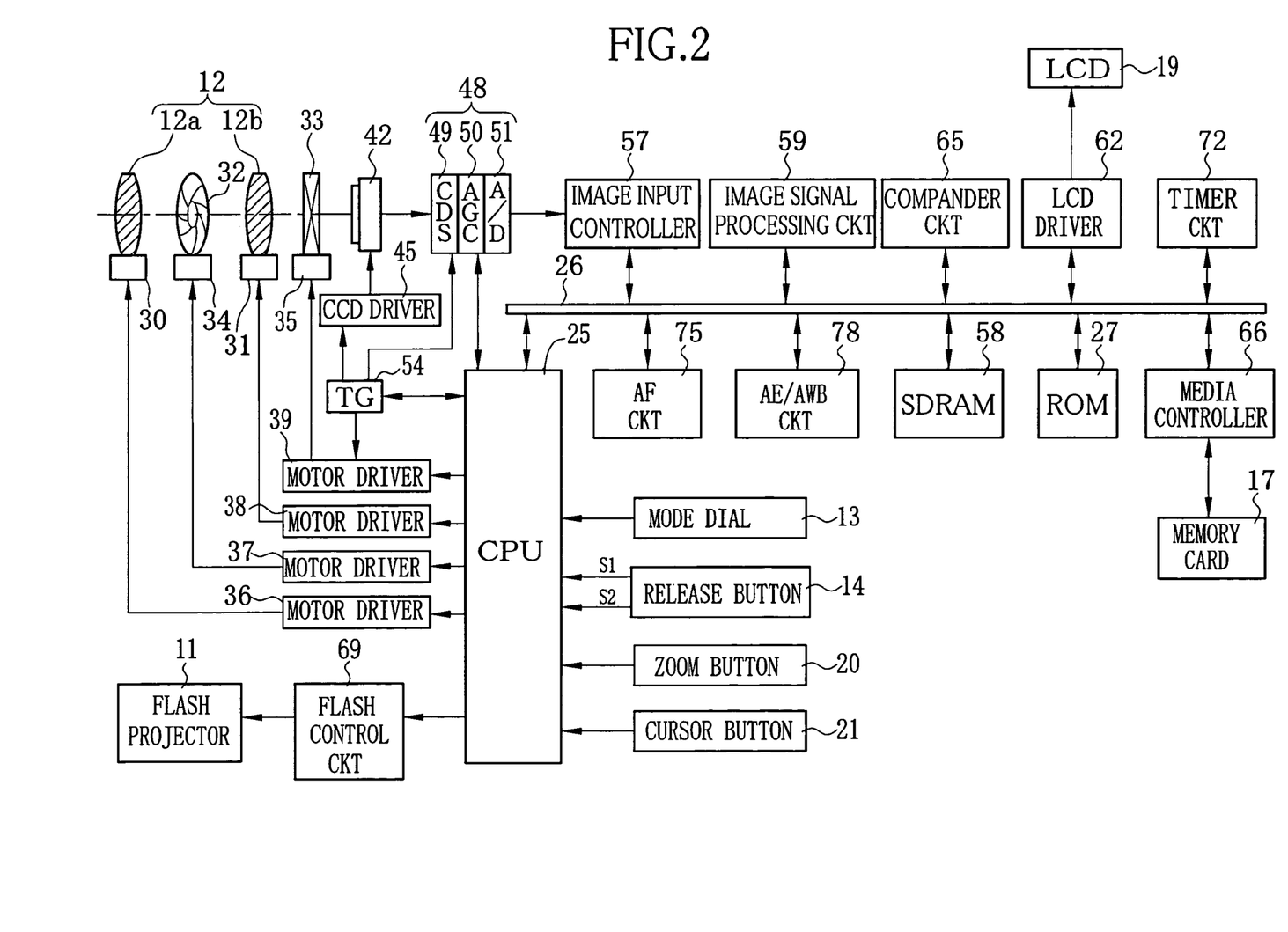
FIG. 2 is a block diagram illustrating the internal structure of the digital camera of FIG. 1.

As shown in FIG. 2, respective components of the digital camera 10 are controlled by a CPU 25. A ROM 27 is connected to the CPU 25 through a data bus 26. The ROM 27 stores control programs and various data. According to the control programs, the CPU 25 controls the components in response to operation signals entered through the mode dial 13, the release button 14, the zoom button 20, the cursor button 21 and the like.

The taking lens 12 consists of a zoom lens 12a and a focusing lens 12b. These lenses 12a and 12b are driven to move along an optical axis by drive mechanisms 30 and 31 including motors, respectively. As top mechanism 32 for changing the aperture value is mounted in between the zoom lens 12a and the focusing lens 12b. A mechanical shutter 33 is mounted behind the focusing lens 12b, and a CCD 42 is placed behind the mechanical shutter 33. The stop mechanism 32 and the mechanical shutter 33 are driven by respective drive mechanisms 34 and 35 including motors. The respective motors of the drive mechanisms 30, 31, 34 and 35 are driven by respective motor drivers 36, 37, 38 and 39 under the control of the CPU 25.

The stop mechanism 32 changes the aperture value, for example, in five steps within a range from F/2.8 to F/11 in the notation of f-number. The mechanical shutter 33 opens or closes the optical path to the CCD 42. As well-known in the art, the CCD 42 has a light receiving surface, on which a large number of photo sensor cells, or called pixels, are arranged in a matrix. The optical image formed through the taking lens 12 on the light receiving surface is converted into an electric signal by accumulating electric charges in the individual photo sensor cells. While the electric charges are read out from the CCD 42, the shutter mechanism 33 blocks the light from the CCD 42, in order to prevent a smear noise. Note that a CMOS type image sensor may be substituted for the CCD 42.

The CCD 42 is driven by a CCD driver 45. The CCD driver 45 controls charge accumulation time of the CCD 42, which is equivalent to exposure time or shutter speed, based on a command from the CPU 25. Synchronously with a vertical transfer clock signal and a horizontal transfer clock signal, which are supplied from the CCD driver 45, the CCD 42 outputs the charges accumulated in the individual sensor cells, line after line as a serial image signal (CCD-RAW data). Therefore, the CCD driver 45 and the shutter mechanism 33 constitute a shutter speed changing device of the present invention.

The image signal from the CCD 42 is fed to an analog front end (AFE) circuit 48. The AFE circuit 48 consists of a correlated double sampling (CDS) circuit 49, an automatic gain control (AGC) circuit 50, and an analog-to-digital (A/D) converter 51. The CDS circuit 49 eliminates noises from the image signal. The AGC circuit 50 amplifies the image signal at a set amplification factor, and constitutes a sensitivity changing device for changing imaging sensitivity of the imaging system consisting of the CCD 42 and the AFE circuit 48. The AGC circuit 50 basically amplifies the image signal at a standard amplification factor corresponding to ISO200, but is gradually switched to a higher amplification factor as the subject brightness gets lower. The A/D converter 51 converts the amplified image signal into a digital form; the digitalized image signal is called image data.

A timing pulse generator (TG) 54 generates a referential pulse signal, and supplies it to the CCD driver 45, the AFE circuit 48 and the motor driver 39 for the shutter mechanism 33. The CCD driver 45 generates the vertical and horizontal transfer clock signals based on the reference pulse signal from the timing generator 54, and supplies these clock signals to the CCD 42. The AFE circuit 48 carries out the above-described signal processing synchronously with the reference pulse signal. The motor driver 39 opens or closes the shutter mechanism 33 synchronously with the reference pulse signal.

An image input controller 57 is connected to the CPU 25 through the data bus 26, and reads or writes the image data under the control of the CPU 25. More specifically, the image input controller 57 reads the image data out of the AFE circuit

48, and writes it in an SDRAM 58. The image input controller 57 reads the image data out of the SDRAM 58, and writes it in an image signal processing circuit 59.

The image signal processing circuit 59 processes the image data for gradation conversion, white balance correction, γ correction and other kinds of image processing, and then converts the image data into a luminance signal Y and chroma signals Cr and Cb through YC-conversion. The YC-converted image signal is fed to an LCD driver 62, to display the camera-through image.

A compander circuit 65 compresses the YC-converted image data according to a predetermined format, e.g. the JPEG format, before the image data is written in the memory card 17. In the reproduction mode, the compander circuit 65 expands the image data of the compressed format, e.g. the JPEG format, to the YC signals, as the image data is read out of the memory card 17, to reproduce the captured image on the LCD 19. A media controller 66 writes or reads the image data in or out of the memory card 17.

The flash projector 11 is an electronic flash device using a xenon tube, and is controlled by a flash control circuit 69. The flash control circuit 69 includes a flashing circuit that supplies the xenon tube with a high-voltage current for causing the xenon tube to emit the flash light.

A timer circuit 72 functions as a clock while being supplied from a backup battery built in the digital camera 10. The CPU 25 retrieves data of present time from the timer circuit 72 each time the digital camera 10 is powered on, and thereafter clocks by itself to determine date and time of each shot.

An AF circuit 75 integrates high-frequency components of spatial frequency of the image data as being written in the SDRAM 58. The CPU 25 controls the motor driver 38 to move the focusing lens 12b along the optical axis during the automatic focusing, so that the integration value of the high-frequency component obtained by the AF circuit 75 becomes the largest.

An AE/AWB circuit 78 executes the automatic exposure control (AE) operation in response to the signal S1 that is inputted to the CPU 25 when the release button 14 is pressed halfway. The AE/AWB circuit 78 detects a subject brightness value from the luminance signal Y at the input of the signal S1, and calculates a proper exposure value based on the subject brightness value. According to the calculated proper exposure value, the AE/AWB circuit 78 decides a shutter speed, an aperture value and an imaging sensitivity, and judges whether to emit the flash light or not. Exposure conditions decided by the AE/AWB circuit 78 are fed to the CPU 25, so the CPU 25 controls the CCD driver 45, the mechanical shutter 33, the stop mechanism 32, the AGC circuit 50 and the flash control circuit 69 to provide these exposure conditions.

Figure 3:
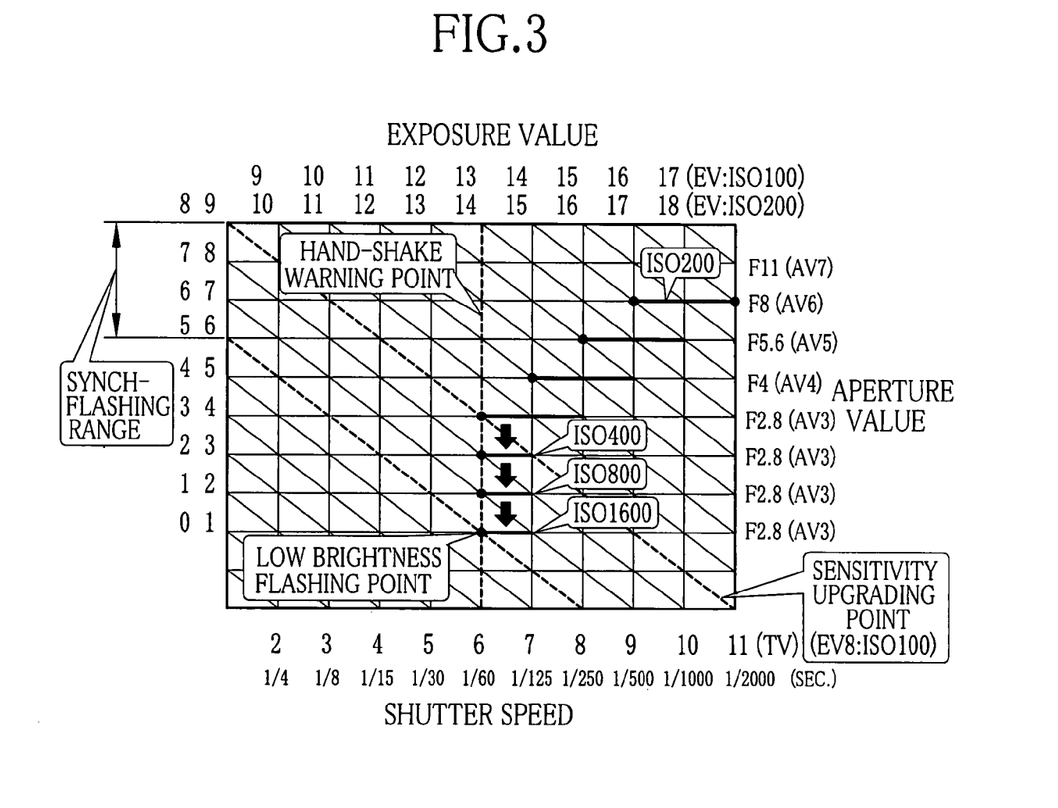
FIG. 3 is a program chart for an automatic exposure control operation including a low brightness rear light judgment by an imaging sensitivity decided for the scene.
Figure 4:
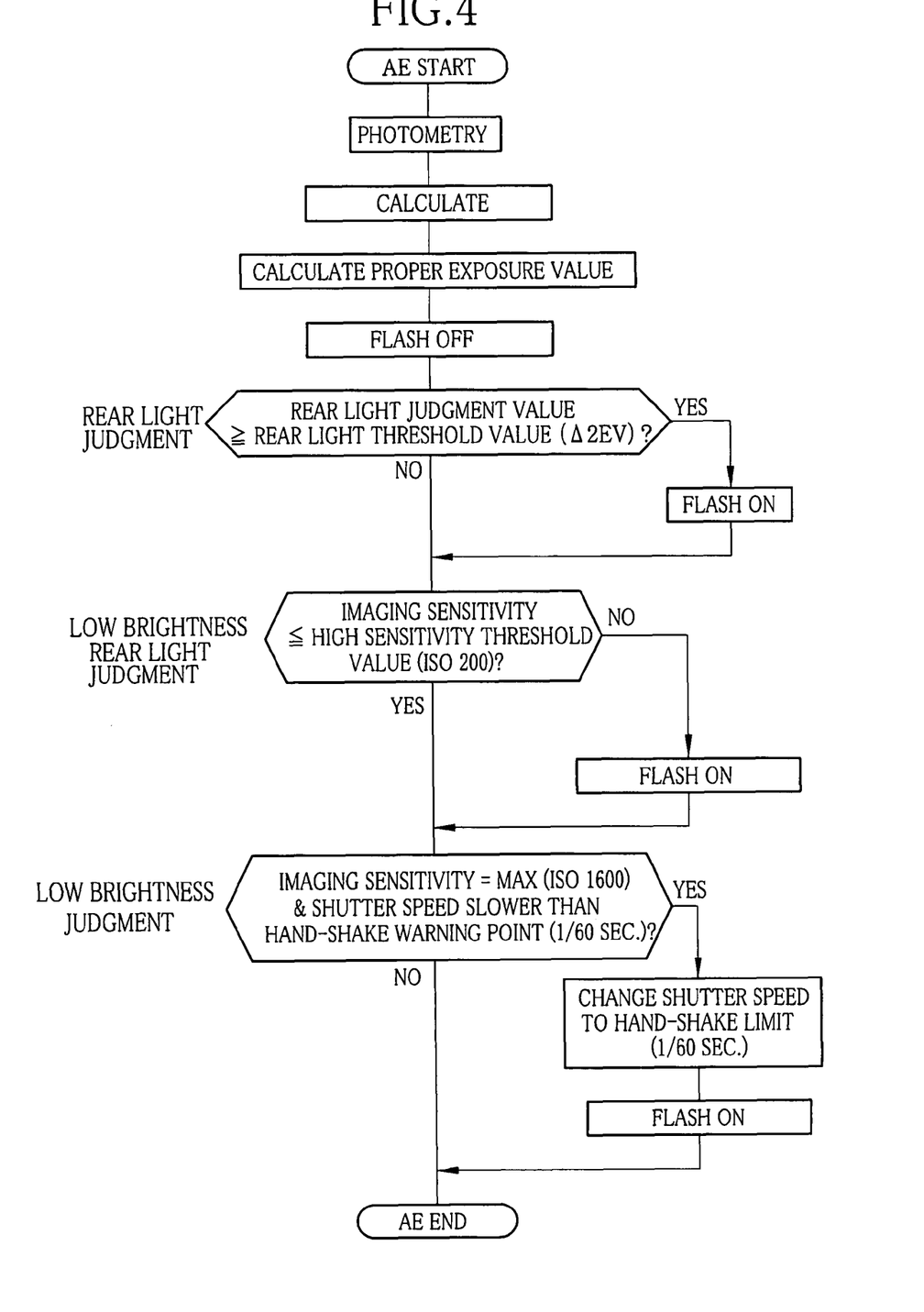
FIG. 4 is a flow chart illustrating the automatic exposure control operation including the low brightness rear light judgment by the imaging sensitivity.

The AE/AWB circuit 78 executes the AE operation, using a program chart shown in FIG. 3 and in a sequence shown in FIG. 4. A horizontal axis shows shutter speed (time value TV), a vertical axis shows aperture value (AV), and diagonal lines represent exposure values (EV). According to the program chart shown in FIG. 3, the digital camera 10 is set at a standard imaging sensitivity of ISO200, an aperture value of F/8 and a shutter speed of 1/500 second at the start of shooting, to display the camera-through image. Thereafter, each time the release button 14 is pressed halfway, a proper exposure value is calculated to revise the aperture value and the shutter speed correspondingly.

A hand-shake warning point, the threshold shutter speed for warning the hand-shake, is set at 1/60 second, because the hand-shake is likely to occur at a slower shutter speed than 1/60 second. When the aperture value is decided to be an open aperture of F/2.8, and the shutter speed is decided to be slower than the hand-shake warning point of 1/60 second, that is, when the calculated proper exposure value is less than EV8 as converted to ISO100 base, the imaging sensitivity is changed gradually from ISO200 to ISO400, ISO800 or ISO1600. So the exposure value EV8 as converted to ISO100 base will be called a sensitivity upgrading point. Simultaneously with the sensitivity upgrading, the shutter speed is set at a hand-shake limit value or a value higher than the hand-shake limit shutter speed. Thus, the hand-shake is prevented. In this example, the hand-shake limit shutter speed is 1/60 second that is equal to the hand-shake warning point.

To detect the subject brightness value, a photometric area is defined in a frame of the image data. In the same way as shown in FIG. 12A, the photometry area 2 is divided into a plural number of segments 2a in this example. In a divisional photometry, a mean subject brightness value is detected from each segment 2a. It is possible to use a center-weighted photometry whereby brightness is measured while attaching weight to a central portion of the photometry area 2, or a spot photometry whereby brightness is measure while attaching weight to a designated portion of the photometry area 2.

As mentioned above, the AE/AWB circuit 78 makes a judgment as to whether the flash projector 11 should emit the flash light or not. Specifically, the judgment on the necessity of flashing is made simultaneously with a rear light judgment, a low brightness rear light judgment and a low brightness judgment, as set forth below.

The rear light judgment is for judging whether a scene to shoot is a backlit scene or not. If the scene is judged to be a rear light one, the flash light is judged to be necessary. The rear light judgment is made based on a difference in brightness between a main subject 3 and a background within the photometry area 2. For example, as shown in FIG. 12B, the segments 2a are partitioned into a central zone 4 and a peripheral zone 5. In most cases, a main subject is placed in the central zone 4, and the peripheral zone 5 corresponds to a background. Photometry is done for each segment 2a, to calculate mean photometric values of the central zone 4 and the peripheral zone 5, hereinafter referred to as the central area photometric value and the peripheral area photometric value respectively.

The central area photometric value is subtracted from the peripheral area photometric value to obtain a photometric value difference, as shown in a formula (1). The photometric value difference is compared as a rear light judgment value with a rear light threshold value, as shown in formulas (2) and (3). If the scene is as shown in FIG. 13A, the rear light judgment value becomes larger than the rear light threshold value, so the scene of FIG. 13A is judged to be a backlit scene, and the flash light is judged to be necessary. If the rear light judgment value is less than the rear light threshold value, the scene is judged to be a normal lit scene, and the flash light is judged to be unnecessary. In order to avoid misjudging a scene having a dark subject in the central zone 4 to be a backlit scene, the rear light threshold value is set at a relatively large value, e.g. Δ2EV.

rear light judgment value=peripheral area photometric value−central area photometric value (1);

Backlit scene: rear light judgment value≧a rear light threshold value (2);

Normal lit scene: rear light judgment value<rear light threshold value (3).

In the rear light judgment, the flash light is judged to be necessary when the scene is judged to be a backlit one, in the entire area of the program chart of FIG. 3. Note that the rear light threshold value is stored for example in the ROM 27, and is read by the AE/AWB circuit 78 during the AE operation.

The low brightness rear light judgment is for discriminating such a scene as shown for example in FIG. 13B, called a low brightness backlit scene, wherein a peripheral zone 5 consists of a higher brightness portion around a main subject 3 and a lower brightness portion around the higher brightness portion. The low brightness backlit scene can come up when the main subject 3 is under a bright illumination light at night. In the above-described rear light judgment, because the rear light judgment value becomes less than the rear light threshold value, the low brightness backlit scene is not judged to be a backlit scene even while it is actually a backlit scene.

According to the present embodiment, in order to discriminate the low brightness backlit scene, the low brightness rear light judgment is made based on the imaging sensitivity. Since the imaging sensitivity is changed to be a higher value when the aperture value is at the open aperture and the shutter speed decided by the proper exposure value is slower than the hand-shake warning point, it is possible to discriminate the low brightness backlit scene by checking the imaging sensitivity decided according to the proper exposure value.

Specifically, the imaging sensitivity decided according to the proper exposure value is compared with a predetermined high sensitivity threshold value that is a maximum imaging sensitivity by which the scene to shoot is not judged to be the low brightness backlit scene. That is, if the imaging sensitivity decided according to the proper exposure value is higher than the high sensitivity threshold value, the scene is judged to be the low brightness backlit scene, and the flash light is judged to be necessary. For example, where the high sensitivity threshold value is set at the standard sensitivity of ISO200, the scene for which the imaging sensitivity is decided to be equal to or higher than ISO400 is judged to be the low brightness backlit scene.

In this way, even in such a low brightness backlit scene for which the proper exposure value is calculated to be EV8 to EV5 as converted to ISO100 base, the flash light is automatically projected. Thus, degrading of the subsequent image will not occur, which would occur without the flash light. Note that the high sensitivity threshold value is stored for example in the ROM 27, and is read by the AE/AWB circuit 78 on the low brightness rear light judgment.

The low brightness judgment is made for emitting the flash light when the subject brightness is so dark that under-exposure is unavoidable just by adjusting the shutter speed, the aperture value and the imaging sensitivity. According to the present embodiment, when the calculated proper exposure value is less than EV5 as converted to ISO100 base, where the imaging sensitivity is at the maximum, i.e. ISO1600, and the shutter speed is slower than the hand-shake warning point, i.e. ⅙₀ second, the shutter speed is changed to the hand-shake limit value, i.e. ⅙₀ second, and the flash light is judged to be necessary.

Figure 5:
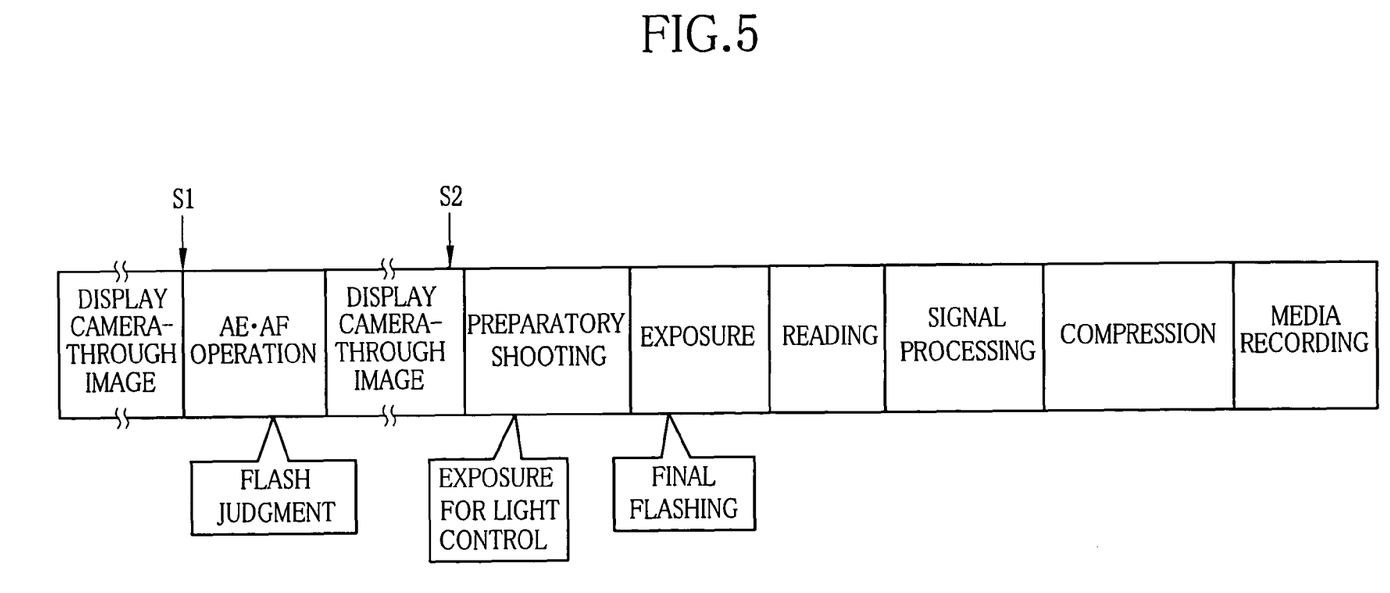
FIG. 5 is an explanatory diagram illustrating a sequence for a flash shot.

Now the shooting operation of the digital camera 10 will be described with reference to FIGS. 4 and 5. As the digital camera 10 is set in the still image shooting mode, it starts displaying the camera-through image. On displaying the camera-through image, the imaging sensitivity is set at the standard value of ISO200, the aperture value at F/8, and the shutter speed at ⅟₅₀₀ second. When the release button 14 is pressed halfway while the camera-through image is being displayed, the signal S1 is fed to the CPU 25, to start up the AE and AF operations.

Upon the signal S1 being fed to the CPU 25, the AE/AWB circuit 78 executes the divisional photometry using the luminance signal Y of the image data that is taken out of the AFE circuit 48. Next, a difference between the central area photometric value and the peripheral area photometric value is calculated as the rear light judgment value. Also a proper exposure value is calculated based on the subject brightness detected through the divisional photometry. The flash is initialized to be OFF.

Then the AE/AWB circuit 78 reads out the rear light threshold value from the ROM 27, and compares it with the rear light judgment value, to make the rear light judgment. If the rear light judgment value is larger than the rear light threshold value, the scene to shoot is judged to be a backlit scene, and the flash is judged to be ON.

The AE/AWB circuit 78 also reads out the high sensitivity threshold value from the ROM 27, and compares it with the imaging sensitivity, to make the low brightness rear light judgment. If the imaging sensitivity is higher than the high sensitivity threshold value, that is, if the imaging sensitivity is equal to or higher than ISO400, the scene to shoot is judged to be a low brightness backlit scene, and the flash is judged to be ON.

Furthermore, the AE/AWB circuit 78 makes the low brightness judgment by checking if the imaging sensitivity is at the maximum (ISO1600) and the shutter speed is slower than the hand-shake warning point. If the answer is yes, the scene is judged to be a low brightness scene. Then, the shutter speed is changed to the hand-shake limit value, and the flash is judged to be ON.

After the AE operation is carried out in this way, and the AF operation is completed, the digital camera 10 displays the camera-through image again. When the release button 14 is pressed fully while the camera-through image is being displayed, the CPU 25 receives the signal S2, and starts the preparatory shooting.

Figure 6:
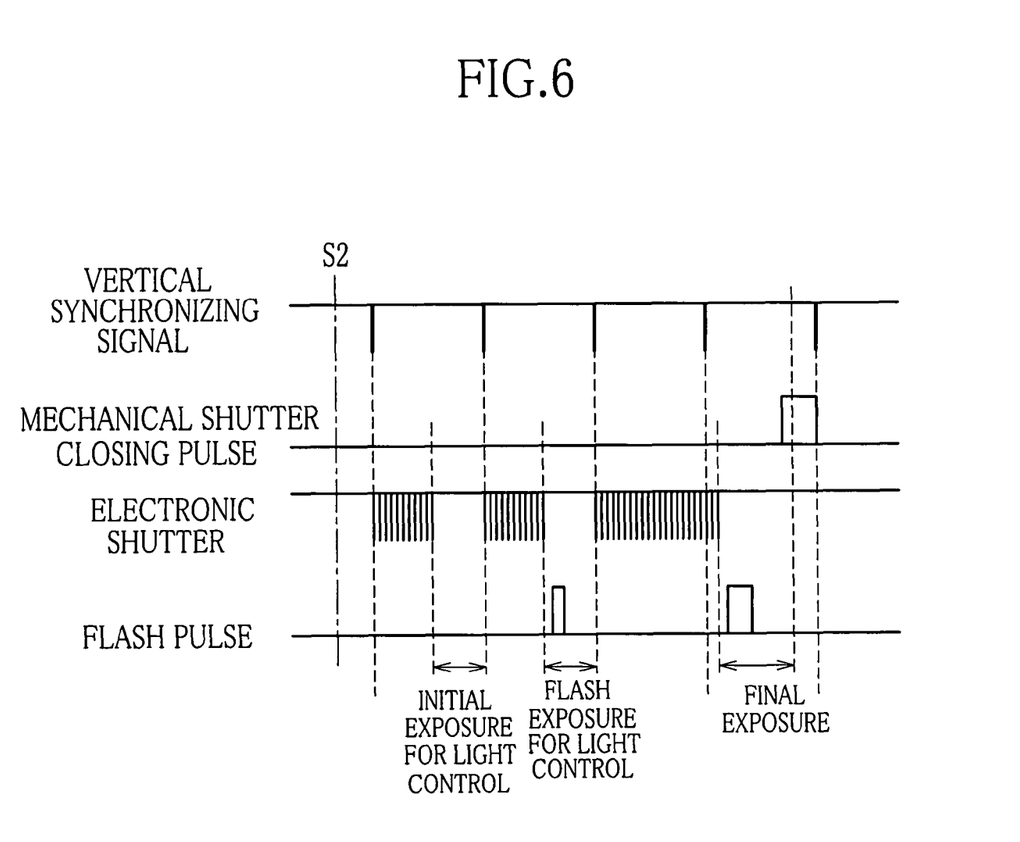
FIG. 6 shows timing charts illustrating the timing of flashing for the flash shot.

As shown in FIG. 6, the CPU 25 controls the CCD driver 45 to drive the CCD 42 to start an initial exposure for light control in the AE and AF operation. Specifically, the CCD driver 45 lets the CCD 42 discharge the accumulated charges in synchronism with a vertical synchronizing signal, and then carry out the initial exposure for light control. Image signal obtained through the initial exposure is converted to digital image data and used for the AE and AF operations. If the flash is judged to be ON in the AE operation upon the signal S1, a flash exposure for light control is carried out with a faint flash light. The timing of flashing and the flash light volume are controlled by the flash control circuit 69. Prior to the flash exposure for light control, the charges are discharged from the CCD 42 synchronously with the vertical synchronizing signal. Based on image data obtained through the flash exposure, a proper exposure value and a proper flash light volume is determined for a flash shot.

Then, the CCD driver 45 lets the CCD 42 discharge the accumulated charges synchronously with the vertical synchronizing signal, and then carry out a final exposure. The final exposure is carried out based on the proper exposure value and, if necessary, with a flash light of the proper volume. After the final exposure, the mechanical shutter 33 is closed, to start reading the charges accumulated in the CCD 42.

The charges read out of the CCD 42 are fed as analog image signal to the AFE circuit 48, and converted to digital image data. The image input controller 57 reads the image data out of the AFE circuit 48, and sends it to the image signal processing circuit 59 for the various signal processing. The processed image data is written in the SDRAM 58, and is read out to be compressed into the JPEG format by the compander circuit 65. The media controller 66 writes the compressed image data in the memory card 17.

As described so far, the digital camera 10 of the present embodiment makes the low brightness rear light judgment, and projects a flash light when the scene to shoot is judged to be a low brightness backlit scene. Therefore, the digital camera 10 can prevent degrading of the captured image of the low brightness backlit scene, which would occur without the flash light. Furthermore, since the rear light judgment for discriminating an ordinary rear light scene is made before the low brightness rear light judgment, the low brightness rear light judgment is made with higher accuracy. Moreover, because the digital camera 10 makes the low brightness judgment besides the rear light judgment and the low brightness rear light judgment, the flash judgment as to whether the flash light is necessary or not gets very accurate and delicate.

Figure 7:
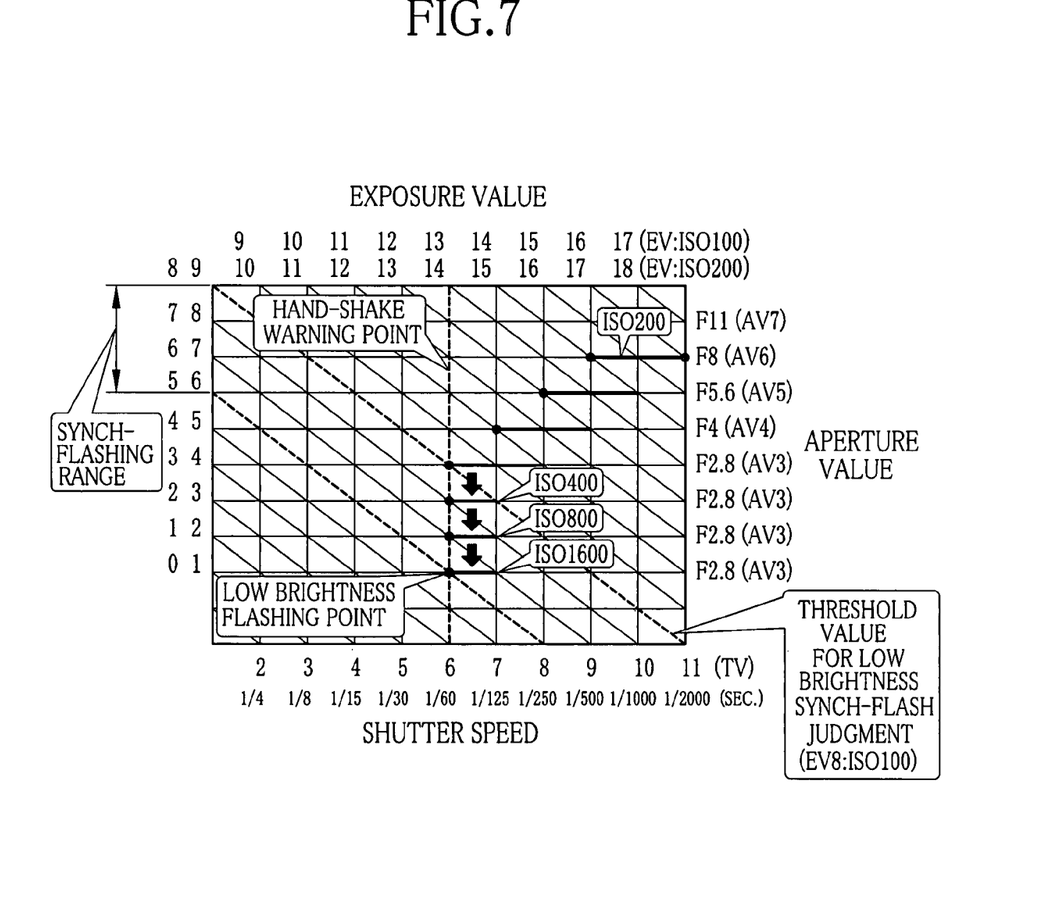
FIG. 7 is a program chart for an automatic exposure control operation including a low brightness rear light judgment by a calculated proper exposure value.
Figure 8:
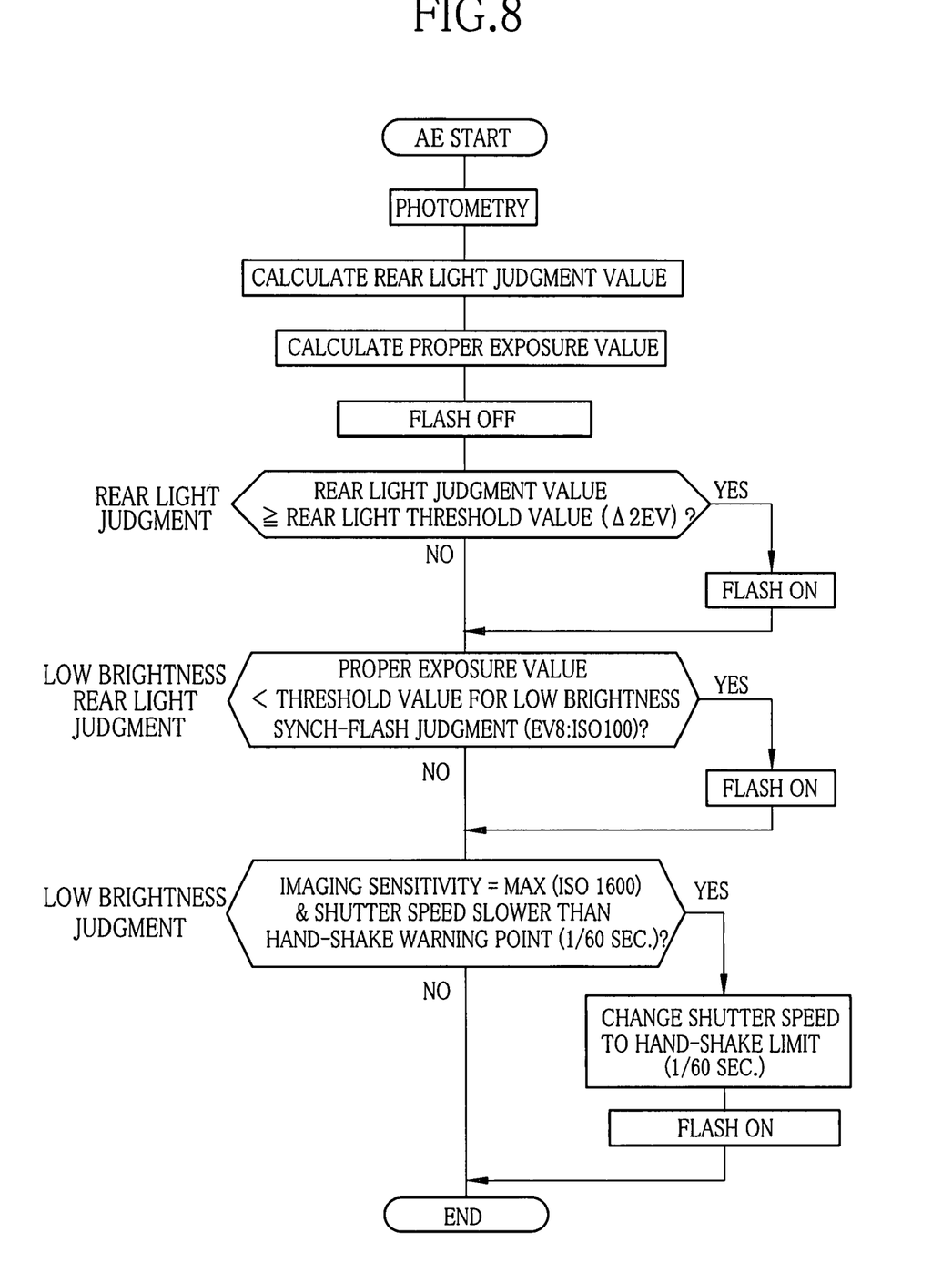
FIG. 8 is a flow chart illustrating the automatic exposure control operation including the low brightness rear light judgment by the proper exposure value.

Although the judgment as to whether the scene is a low brightness backlit scene or not is made with reference to the imaging sensitivity in the above embodiment, it is possible to make the low brightness rear light judgment with reference to the proper exposure value calculated based on the measured subject brightness, as shown in FIGS. 7 and 8. Because the proper exposure value varies depending upon the subject brightness, it is possible to judge the scene by the proper exposure value decided for this scene.

According to the second embodiment, a minimum proper exposure value, by which the scene to shoot is not judged to be a low brightness backlit scene, is predetermined as a threshold value for low brightness synch-flash judgment. In the low brightness judgment, the proper exposure value is compared with the low brightness synch-flash judgment threshold value, and the scene is judged to be a low brightness backlit scene when the proper exposure value is less than the low brightness synch-flash judgment threshold value. For example, the low brightness synch-flash judgment threshold value is set at EV8 as converted to ISO100 base. In that case, if the proper exposure value is equal to or less than EV7 as converted to ISO100 base, the scene is judged to be a low brightness backlit one, and the flash is judged to be ON.

Thus, the low brightness backlit scene is discriminated based on the proper exposure value, and the flash light is automatically projected to the low brightness backlit scene. So the second embodiment is effective to prevent the image degrading of the low brightness backlit scene, which would occur without the flash.

In the low brightness rear light judgment of the above embodiments, which is made only by the imaging sensitivity or the proper exposure value, there is a risk of flashing to a front-lit scene at a high imaging sensitivity. In that case, the obtained image is over-exposed and bleached out. To solve this problem, it is preferable to change the threshold value for the rear light judgment according to the calculated proper exposure value, as shown for example in FIGS. 9 and 10.

Figure 9:
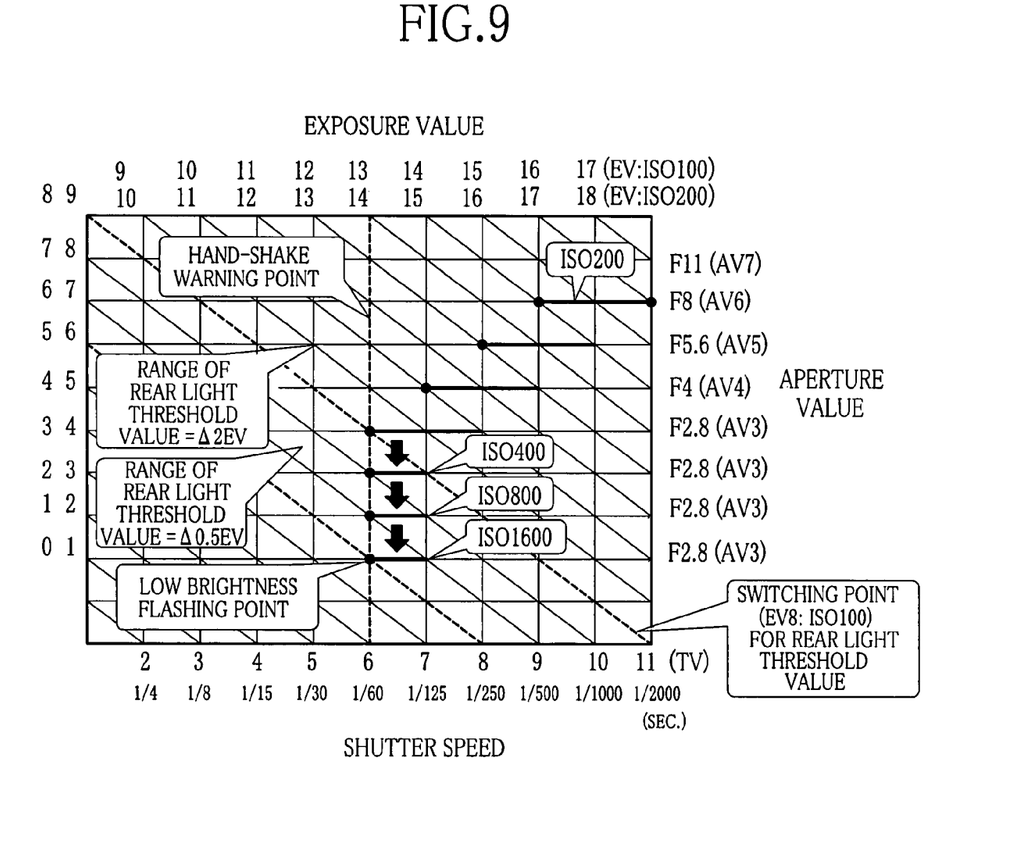
FIG. 9 is a program chart for an automatic exposure control operation including a low brightness rear light judgment using a different threshold value from that used for discriminating an ordinary backlit scene.
Figure 10:
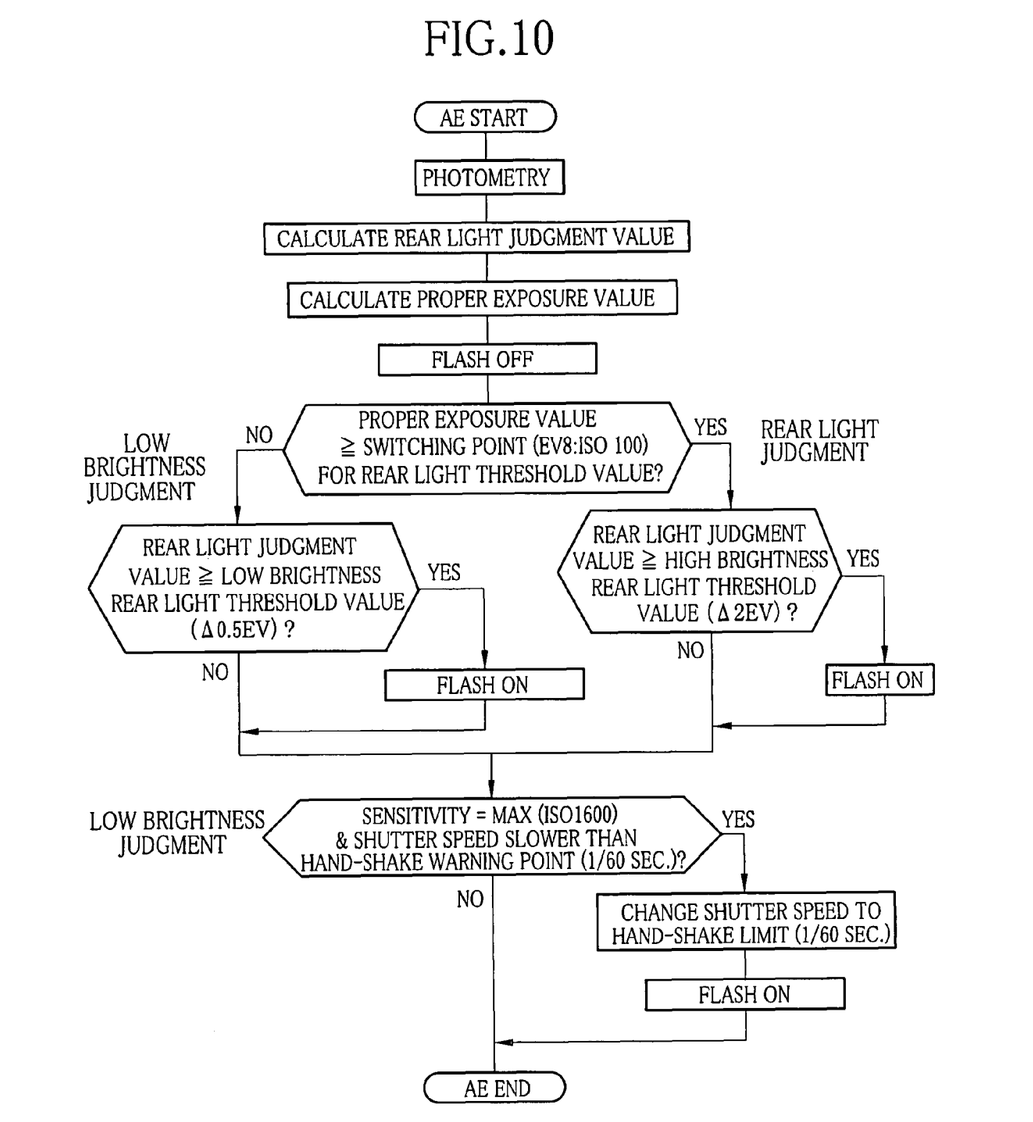
FIG. 10 is a flow chart illustrating the automatic exposure control operation according to the program chart of FIG. 9.

According to the embodiment shown in FIGS. 9 and 10, the proper exposure value is compared with a predetermined minimum proper exposure value, by which the scene is not judged to be a low brightness backlit scene, and the rear light threshold value for use in the rear light judgment is changed over depending upon the result of comparison. Preferably, the minimum proper exposure value for changing the rear light threshold value, hereinafter referred to as a switching point for rear light threshold value, is predetermined to be EV8 as converted to ISO100 base, that is equal to the sensitivity upgrading point for switching the imaging sensitivity from the standard one to a higher one.

When the proper exposure value calculated according to the subject brightness is not less than the switching point for rear light threshold value, a predetermined high brightness rear light threshold value is used for the comparison with the rear light judgment value, to judge whether the scene is an ordinary backlit scene or not. Preferably, the high brightness rear light threshold value is ΔEV2, like the threshold value used for the conventional rear light judgment.

When the proper exposure value is less than the switching point for rear light threshold value, a predetermined low brightness rear light threshold value is used for the comparison with the rear light judgment value, to judge whether the scene is a low brightness backlit scene or not. Preferably, the low brightness rear light threshold value is ΔEV0.5, considering the fact that the photometric value difference between the center area and the peripheral area is small in the low brightness rear light scene.

In this way, the judgment as to whether the scene is a backlit one or not is carried after discriminating the low brightness scene from the high brightness scene, and the low brightness rear light judgment is carried out with the specific threshold value that is smaller than that for the ordinary rear light judgment. Therefore, the risk of flashing to a front-lit scene at a high imaging sensitivity is eliminated, and the bleaching of the image is prevented, while improving the image quality of the low brightness backlit scene.

Although the embodiments of the present invention have been described with respect to the digital camera that can change the imaging sensitivity step by step, the present invention is applicable to a digital camera that can change the imaging sensitivity continuously. The threshold values used in the above embodiments are cited as examples, and are variable according to the imaging device and the flash device used in the digital camera.

Thus, the present invention is not to be limited to the above embodiments but, on the contrary, various modifications will be possible without departing from the scope of claims appended hereto.

What is claimed is:

1. An exposure control method for a sensitivity changeable imaging apparatus with a flash device, comprising steps of:
   measuring subject brightness from a photometry area of a scene to shoot;
   calculating based on the measured subject brightness a proper exposure value at a predetermined standard imaging sensitivity;
   deciding based on the calculated proper exposure value at least a shutter speed and an imaging sensitivity; and
   comparing the calculated proper exposure value with a predetermined threshold exposure value, to decide that said flash device is to emit a flash light when the calculated proper exposure value is lower than the predetermined threshold exposure value, wherein said step of deciding the shutter speed and the imaging sensitivity based on the proper exposure value comprises steps of:
   comparing the decided shutter speed with a predetermined hand-shake warning threshold value; and
   changing the imaging sensitivity to a value higher than the standard sensitivity and the shutter speed to a predetermined hand-shake limit shutter speed or a value higher than the hand-shake limit shutter speed, when the decided shutter speed is slower than the hand-shake warning threshold value.

2. An exposure control method as claimed in claim 1, wherein if the imaging sensitivity is changed to a maximum value when the decided shutter speed is slower than the hand-shake warning threshold value, the shutter speed is changed to the hand-shake limit value, and the flash device is decided to emit a flash light.

3. An exposure control method as claimed in claim 2, wherein the hand-shake warning value is such that hand-shake is likely to occur at a shutter speed slower than the hand-shake warning value, and the hand-shake limit value is a slowest limit shutter speed at which the hand-shake does not normally occur.

* * * * *